United States Patent
Rotzoll et al.

(10) Patent No.: US 6,806,458 B2
(45) Date of Patent: Oct. 19, 2004

(54) METHOD, SENSING DEVICE AND OPTICAL POINTING DEVICE INCLUDING A SENSING DEVICE FOR COMPARING LIGHT INTENSITY BETWEEN PIXELS

(75) Inventors: Robert R. Rotzoll, Cascade, CO (US); Kevin Scott Buescher, Colorado Springs, CO (US); James Harold Lauffenburger, Colorado Springs, CO (US)

(73) Assignee: Em Microelectronic - Marin SA, Marin (CH)

( * ) Notice: Subject to any disclaimer, the term of this patent is extended or adjusted under 35 U.S.C. 154(b) by 244 days.

(21) Appl. No.: 10/001,963

(22) Filed: Dec. 5, 2001

(65) Prior Publication Data

US 2003/0102425 A1 Jun. 5, 2003

(51) Int. Cl.⁷ .............................................. G06M 7/00
(52) U.S. Cl. ...................................................... 250/221
(58) Field of Search ........................... 250/221, 559.21, 250/559.29, 208.1, 208.2, 214 R

(56) References Cited

U.S. PATENT DOCUMENTS 5,240,205 A   8/1993  Allongue 6,124,587 A   9/2000  Bidiville et al.
6,362,482 B1 * 3/2002  Stettner et al. ........ 250/370.08

FOREIGN PATENT DOCUMENTS

EP    1 043 688 A2   10/2000

\* cited by examiner

*Primary Examiner*—Thanh X. Luu
(74) *Attorney, Agent, or Firm*—Sughrue Mion, PLLC

(57) ABSTRACT

There is described a method, a sensing device as well as an optical pointing device including a sensing device for comparing light intensity between pixels. Light intensity between pairs of pixels of a photodetector array is compared as follows. First and second output signals generated by the photosensitive elements of a first and a second pixel of each pair are integrated over time to respectively provide first and second integrated signals. Integration of the first output signal is interrupted at the end of a first time period and the resulting first integrated signal is stored. Integration of the second output signal is continued until the end of a second time period and the resulting second integrated signal is compared to the stored first integrated signal to provide an output signal representative of an edge condition between the first and second pixel.

23 Claims, 10 Drawing Sheets

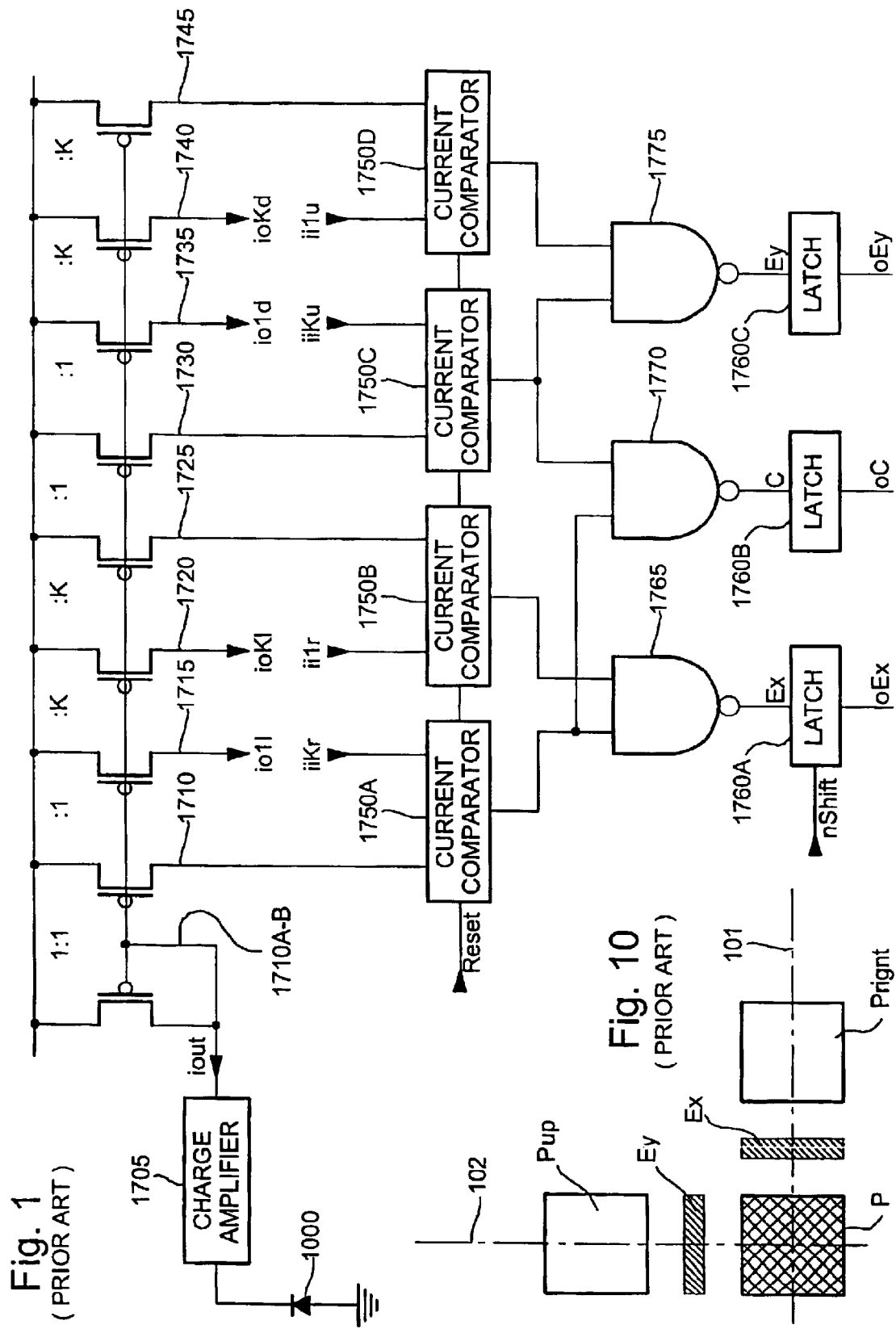

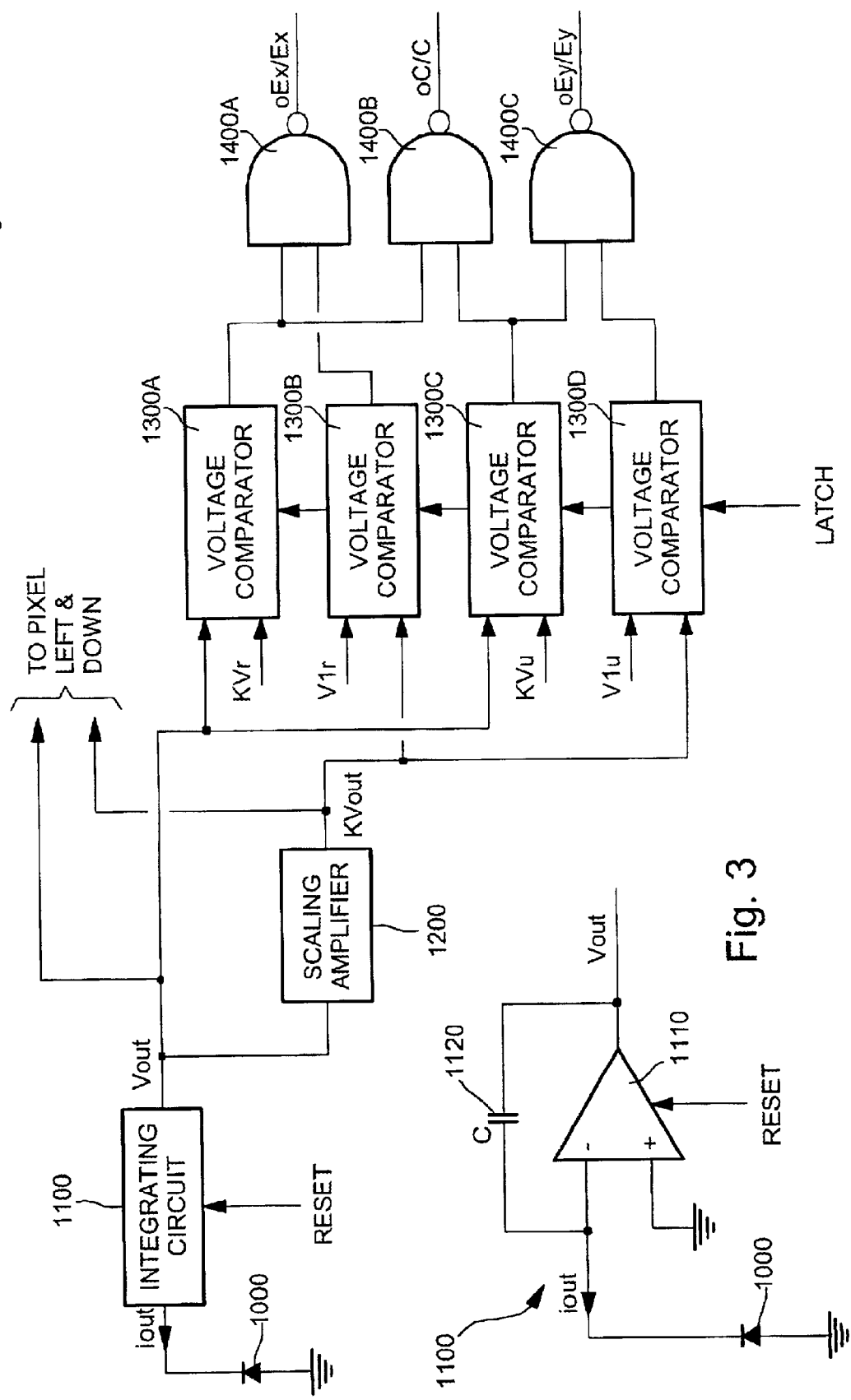

METHOD, SENSING DEVICE AND OPTICAL POINTING DEVICE INCLUDING A SENSING DEVICE FOR COMPARING LIGHT INTENSITY BETWEEN PIXELS

FIELD OF THE INVENTION

The present invention generally relates to pointing devices, in particular for controlling the position of a cursor on a screen, such as the display of a personal computer, workstation or other computing devices having a graphic user interface. Such pointing devices may for instance include mice, trackballs and other computer peripherals for controlling the position of a cursor on a display screen.

The present invention more particularly relates to the field of optical pointing devices which comprise an optical sensing device including a photodetector array for measuring the varying intensity pattern of a portion of a surface which is illuminated with radiation and for extracting information about the relative motion between the photodetector array and the illuminated portion of the surface.

BACKGROUND OF THE INVENTION

Optical pointing devices are already known in the art. U.S. Pat. No. 5,288,993, which is incorporated herein by reference, for instance discloses a cursor pointing device utilizing a photodetector array and an illuminated target ball having randomly distributed speckles. U.S. Pat. No. 5,703,356 (related to the above-mentioned U.S. Pat. No. 5,288,993), which is also incorporated herein by reference, further discloses (in reference to FIGS. 23A and 23B of this document) an optical cursor pointing device in the form of a mouse which does not require a ball and wherein light is reflected directly from the surface over which the pointing device is moved.

The imaging technique used in above-cited U.S. Pat. Nos. 5,288,993 and 5,703,356 in order to extract motion-related information is based on a so-called "Edge Motion Detection" technique. This "Edge Motion Detection" technique essentially consists in a determination of the movement of edges (i.e. a difference between the intensity of pairs of pixels) in the image detected by the photodetector array. Edges are defined as spatial intensity differences between two pixels of the photodetector array. The relative motion of each of these edges is tracked and measured so as to determine an overall displacement measurement which is representative of the relative movement between the photodetector array and the illuminated portion of the surface.

More particularly, according to U.S. Pat. No. 5,288,993, edges are determined between pairs of pixels aligned along a first axis of the photodetector array (for example in each row of the photodetector array) and between pairs of pixels aligned along a second axis of the photodetector array (for example in each column of the photodetector array). FIG. 10 depicts three pixels of the photodetector array, a first pixel or current pixel P, a second pixel Pright aligned with the first pixel P along a first axis 101, and a third pixel Pup aligned with the first pixel P along a second axis 102. Pixels Pright and Pup are show as being disposed on the right side and top side of pixel P for the purpose of explanation only. It will be appreciated that axes 101 and 102 may be orthogonal (as shown) or alternatively non orthogonal. It will also be appreciated that the pixel are not necessarily disposed so as to form a regular array having rows and columns. Other suitable arrangements may very well be envisaged.

For the purpose of simplification, the pixels of FIG. 10 are either shown as being white or black, a black pixel denoting an illuminated pixel. In this case, pixel P is illuminated and first and second edge conditions Ex, Ey exist respectively between pixels P and Pright along the first axis 101 and between pixels P and Pup along the second axis 102.

According to U.S. Pat. No. 5,288,993 and U.S. Pat. No. 5,703,356, the displacement measurement is evaluated, on the one hand, based on a normalized difference between the number of edges Ex which move in a first direction along the first axis 101 and edges Ex which move in the opposite direction along the first axis 101 (for example edges which from left to right and right to left in each row of the photodetector array), and, on the other hand, based on a normalized difference between the number of edges Ey which move in a first direction along the second axis 102 and edges Ey which move in the opposite direction along the second axis 102 (for example edges which move downwards and upwards in each column of the photodetector array).

Relative motion of edges is determined by comparing the position of these edges in the photodetector array at a first point in time with the position of edges in the photodetector array at a subsequent point in time. The optical pointing device thus typically comprises a light source (such as an infrared LED) which intermittently illuminates the portion of the surface in accordance with a determined sequence, and the pixel outputs of the photodetector array are sampled in accordance with the determined sequence to provide two successive sets of edge data that are compared to each other in order to determine a relative motion measurement.

According to one embodiment of U.S. Pat. No. 5,288,993 and U.S. Pat. No. 5,703,356 a differential technique is advantageously used in order to determine an edge condition between two pixels. According to this embodiment, an edge is defined as laying between two pixels if the ratio of intensities of the two photosensitive elements is larger than a determined level. An edge may thus be defined mathematically by the following Boolean expression:

Intensity[PIXEL 1]>K Intensity[PIXEL 2]

OR

K Intensity[PIXEL 1]<Intensity[PIXEL 2]     (1)

where K is the selected scaling factor.

It will be appreciated that the first and second parts of the above expression, taken individually, each define an edge condition between the two pixels.

According to U.S. Pat. No. 5,703,356, the differences of intensities or edges between pixels is sensed as a difference in currents. More particularly, FIG. 17A of this document shows a differential current sensor for detecting an edge condition between two pixels. FIG. 1 of the present specification illustrates this differential current sensor. In this example, the current iout generated by the photosensitive element 1000 of the pixel is applied (after charge amplification by means of the charge amplifier 1705) on a input branch 1710A–B of a current mirror comprising eight output branches 1710, 1715, 1720, 1725, 1730, 1735, 1740 and 1745, four of which (output branches 1710, 1715, 1730 and 1735) output a non-scaled image of the input current iout. The other four output branches 1720, 1725, 1740, 1745 output a scaled image of the input current iout (K times the input current iout), the scaling factor K being defined by an adequate choice of the dimensions of the corresponding transistors of the current mirror. Two output branches 1715, 1720 supply the image io1I and the scaled image ioKI of the input current iout to the pixel on the left. Similarly two output branches 1735, 1740 supply the image io1d and the scaled image ioKd of the input current iout to the pixel below.

The differential current sensor further comprises two pairs of comparator circuits 1750A–1750B and 1750C–1750D, one pair 1750A–1750B for determining the edge condition, denoted Ex, between two pixels in the same row (in this case between the current pixel and the pixel on its right), the other pair 1750C–1750D for determining the edge condition, denoted Ey, between two pixels in the same column (in this case between the current pixel and the pixel on top). Each comparator circuit has one input connected to a non-scaled output 1710, 1730 or scaled output 1725, 1745 of the current mirror and a second input connected to a non-scaled output (supplying current ii1r, ii1u) or scaled output (supplying current iiKr, iiKu) of the current mirror of the pixel on the right or of the pixel on top. In this example, the outputs of each pair of comparator circuits are additionally combined by means of a logic NAND gates 1765, 1775 to provide a corresponding edge condition.

The output of one current comparator 1750A of the first pair is also combined by means of a logic NAND gate 1770 with the output of one current comparator 1750C of the second pair to provide an additional information about the intensity difference (denoted "COLOR" and referenced C) of the pixel as compared to the adjacent pixels, in this case as compared to the pixel on the right or the pixel on top.

According to U.S. Pat. No. 5,703,356, the two edge conditions Ex, Ey and the additional information C are thus defined mathematically by the following Boolean expressions:

$$Ex = \text{Intensity[pixel]} > K \text{ Intensity[pixel on right]}$$

OR $$K \text{ Intensity[pixel]} < \text{Intensity[pixel on right]} \quad (2)$$

$$Ey = \text{Intensity[pixel]} > K \text{ Intensity[pixel on top]}$$

OR $$K \text{ Intensity[pixel]} < \text{Intensity[pixel on top]} \quad (3)$$

$$C = \text{Intensity[pixel]} > K \text{ Intensity[pixel on right]}$$

OR $$\text{Intensity[pixel]} > K \text{ Intensity[pixel on top]} \quad (4)$$

The outputs of the NAND gates 1765, 1770, 1775 are further connected to latch elements 1760A, 1760B and 1760C for at least temporarily storing the corresponding previous results, oEx, oEy and oC designating the previous outputs of the NAND gates 1765, 1770, 1775.

An alternative to the solution of FIG. 1 consists in providing, for each pixel, an integrating circuit, a scaling amplifier and an adequate number of comparator circuits. FIG. 2 schematically shows an example of such an alternative solution. In this example, the current iout generated by the photosensitive element 1000 of the pixel is applied on a input of an integrating circuit 1100 in order to generate an output voltage Vout. As illustrated in FIG. 3, the integrating circuit 1100 typically consists of an operational amplifier 1110 and a capacitive element 1120 having a determined capacitance C, the capacitive element 1120 being connected between the output and the inverting input of the amplifier 1110, the photosensitive element 1000 being connected to the inverting input of the amplifier and the non-inverting input of the amplifier being tied to a reference potential such as ground. The integrating circuit 1100 accordingly outputs a voltage signal Vout, or integrated signal, which varies over time and which is in essence the result of the integration over time of the current signal iout. Assuming that current iout has a substantially constant value during the period where integrating circuit is active (i.e. during a so-called integration period), the output voltage Vout will vary substantially linearly over time.

The voltage signal Vout is applied to a first input of two comparator circuits 1300A, 1300C and on the input of a scaling amplifier 1200. This scaling amplifier 1200 is designed to output a voltage signal which is a scaled image, denoted KVout, of signal Vout. The non-scaled voltage signals, denoted V1r and V1u, from the pixel on the right and the pixel on top, are respectively applied to a first input of two additional comparator circuits 1300B and 1300D. The scaled voltage signal KVout supplied by the scaling amplifier 1200 is applied on the second input of these two comparator circuits 1300B and 1300D. Similarly, the scaled voltage signals, denoted KVr and KVu, from the pixel on the right and the pixel on top, are respectively applied to a second input of comparator circuits 1300A and 1300C.

Similarly to the example of FIG. 1, NAND gates 1400A, 1400B and 1400C are provided to logically combine the outputs of the comparator circuits in order to generate the edge conditions Ex, Ey and the additional information C.

One serious disadvantage of the two examples illustrated in FIGS. 1 and 2 resides in the fact that they both require specific circuitry for generating the scaled image of the signal outputted by the photosensitive elements. This circuitry thus reduces the available die area and increases the power consumption and complexity of the sensing device.

An additional disadvantage of the above two examples resides in the fact that one has very little control on the scaling factor K of the circuit. Once this scaling factor is defined during fabrication by an adequate choice of the dimensions of the corresponding electronic components, this scaling factor cannot be adjusted by the user.

It addition, according to the prior art solution, the scaling factor K is typically adjusted so that the sensing device is less sensitive to analog measurement noise. In practice, it would be desirable to implement a hysteresis function in the sensing device. According to the prior art solution, one would again have little control and adjustment capability of this hysteresis function.

Accordingly, it is an object of the present invention to provide a solution that requires less die area, allows power consumption to be decreased, and the architecture of the sensing device to be simplified.

It is another object of the present invention to provide a solution that shows greater flexibility and in particular, that allows adjustment of the scaling factor K and/or easy implementation of a hysteresis function.

SUMMARY OF THE INVENTION

According to a first aspect of the invention, there is provided a method for comparing light intensity between pixels of a photodetector array, each of the pixels comprising a photosensitive element generating a sensed output signal in response to radiation, this method comprising the steps of:

integrating the sensed output signals over time to provide an integrated signal for each of the photosensitive elements;

interrupting the integration of a first sensed output signal of a first pixel at the end of a first time period and storing the resulting first integrated signal continuing the integration of a second sensed output signal of a second pixel until the end of a second time period to provide a second integrated signal; and comparing the first and second integrated signals to provide an output signal representative of an edge condition between the first and second pixels.

According to a second aspect of the invention, there is also provided a sensing device for an optical pointing device comprising a plurality of pixels including a first and a second pixel aligned along a first axis, each one of the pixels comprising:

a photosensitive element for generating a sensed output signal in response to radiation; and an integrating circuit connected to the photosensitive element for integrating the sensed output signal over time and for outputting a resulting integrated signal, the sensing device further comprising first comparator means for comparing light intensity between the first and second pixels and for determining if a first edge condition exists between the first and second pixels, wherein the first comparator means comprise a first comparator circuit having one comparator input connected to the integrating circuit of the first pixel and another comparator input connected to the integrating circuit of the second pixel, the sensing device further comprising:

means for resetting the integrating circuits during a resetting period and for releasing these integrating circuits during an integration period means for disconnecting a first comparator input of the first comparator circuit from the corresponding integrating circuit at the end of a first time period;

means for storing the resulting integrated signal on the disconnected first comparator input of the first comparator circuit; and means for latching the first comparator circuit at the end of the integration period.

According to a preferred aspect of the invention, there is provided a method and sensing device as defined above, wherein the integration period of the second pixel output signal has a first duration or a second duration shorter than the first duration depending on a previous state of the comparator circuit output. According to this preferred aspect of the invention, a hysteresis function is implemented. According to a specific embodiment, the second duration of the integration period may be selected to be equal to the duration of the first time period during which the first pixel output signal is integrated.

An optical pointing device including the above sensing device is also the object of the present invention.

According to the present invention, a time-based scaling scheme is implemented thereby allowing the scaling circuits of the prior art to be eliminated. As a consequence, die area as well as power consumption and complexity is reduced. In addition, the scaling factor may simply be adjusted by changing the ratio between the first time period and second time period (also referred to as integration period). Furthermore, this time-based scaling scheme may easily be adapted to implement a hysteresis function that allows sensitivity to noise to be reduced.

Level detection means may be provided for detecting when a first one of the integrated signals generated by the pixel integrating circuits reaches at least first and second determined levels. Accordingly, the first and second time periods are defined by the time for the first one of the integrated signals to reaches these first and second levels. In this case, this time-based scaling scheme also allows time-division to be used to separate analog and digital circuit operations, and in particular inhibit the clock signal supplied to processing means of the optical pointing device. This clock signal inhibition during analog measurement (i.e. during the integration period) eliminates digital impact (coupling, noise) to analog operations, thereby minimizing analog circuit errors and maximizing system sensitivity.

Last but not least, the above solution allows to maximise contrast over the area of the die since the integrating circuits will run until the integrated signal of the brightest pixel of the photodetector array reaches the maximum integration level. The integration time will therefore be dependent on the illumination level, and contrast, for a given illumination level, is always maximized.

Contrast ratio sensing may also easily be implemented by testing all pixels, upon the end of integration, via an analog circuit to detect the minimum integration level. This provides a measurement of the actual signal contrast seen by the sensor array.

Other aspects, features and advantages of the present invention will be apparent upon reading the following detailed description of non-limiting examples and embodiments made with reference to the accompanying drawings.

BRIEF DESCRIPTION OF THE DRAWINGS

FIG. 1 schematically shows a differential current sensor of the prior art for determining an edge condition between pairs of pixels;

FIG. 2 schematically shows a differential voltage sensor of the prior art for determining an edge condition between pairs of pixels;

FIG. 3 is a schematic illustration of an integrating circuit used in the differential voltage sensor of FIG. 2;

FIG. 10 shows three pixels of the photodetector array and their respective edge conditions.

DETAILED DESCRIPTION OF THE INVENTION

Figure 4:
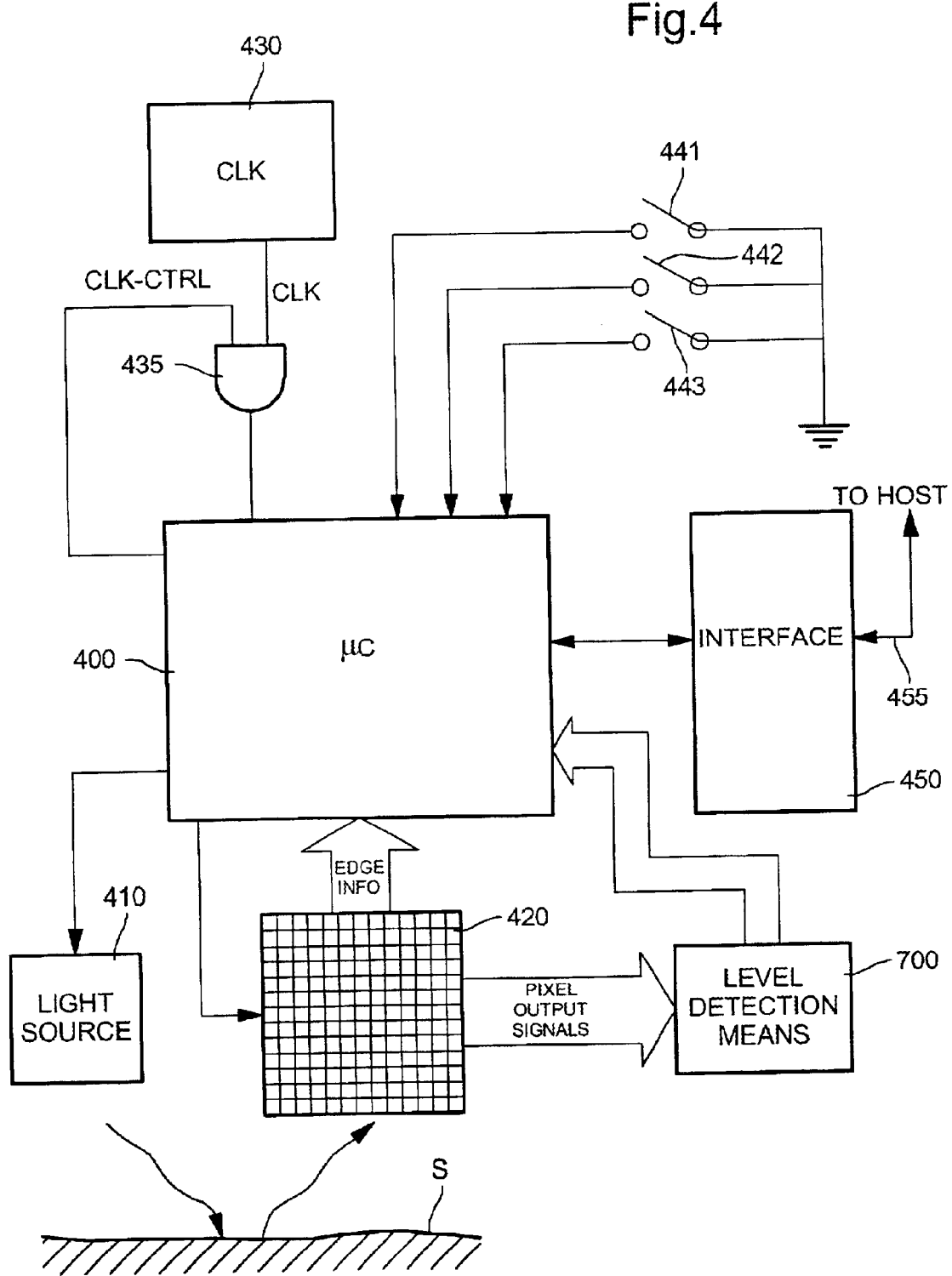
FIG. 4 is a schematic block diagram of an optical pointing device.
Figure 5:
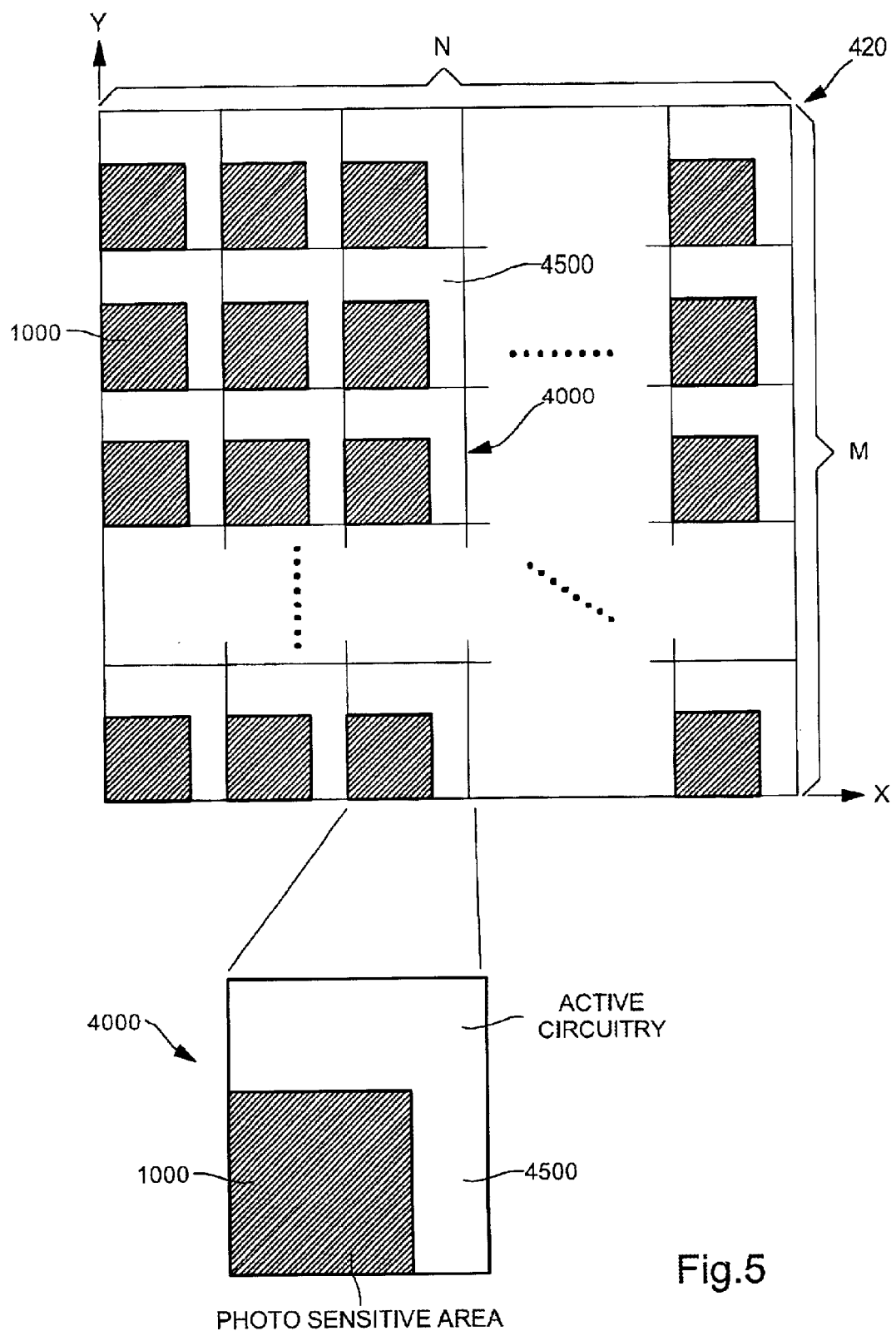
FIG. 5 is a schematic representation of the sensing device's photodetector array and pixel architecture.

FIG. 4 is a generalized schematic bloc diagram of an optical pointing device in accordance with the present invention. It comprises a photodetector array 420 including a plurality of pixels, this photodetector array 420 being connected to processing means 400 which consists, in a non limiting manner, of a micro-controller, microprocessor or other adequate logic circuitry for processing the signals outputted by the photodetector array 420. As schematically illustrated in FIG. 5, the photodetector array 420 is for instance a regular array, preferably square, having M pixel rows (parallel to axis x) and N pixel columns (parallel to axis y). A typical configuration is for instance a 15×15 pixels array. Each pixel of the photodetector array 420, designated by reference numeral 4000, essentially includes a photosensitive area 1000 forming a photodiode (or alternatively a phototransistor) and active circuitry 4500 including preamplifier means and comparator circuits for determining edge conditions between the pixel and at least one of his neighbours. This pixel active circuitry 4500 will be described hereafter in more detail.

According to a preferred embodiment of the invention, processing of the edge information determined by each pixel is done outside of the photodetector array, each pixel transmitting its edge conditions to processing means 400. This allows to reduce the size of the pixel active circuitry and thereby increase the photosensitive area of each pixel for greater sensitivity. This also allows to substantially reduce the pixel array wiring. Within the scope of the present invention, it may however perfectly be envisaged to undertake part of the processing in each pixel, such as the determination of the "move-up", "move-down", "move-left" and "move-right" information, as proposed in U.S. Pat. No. 5,288,993 and U.S. Pat. No. 5,703,356.

Referring again to FIG. 4, the optical pointing device further comprises at least one light source 410 (or more) such as a LED, which produces radiation, preferably monochromatic (such as visible or non-visible light—preferably infrared light), that impinges on a portion of a surface S. Again, surface S may be a planar or non-planar surface such as the surface over which the pointing device is moved (as in the case of an optical mouse), the surface of ball (as in the case of an optical trackball) or any other suitable surface that may provide an appropriate intensity pattern for detection by the photodetector array 420. The optical pointing device typically comprises a window and eventually an optical arrangement (not illustrated) disposed between surface S, on the one hand, and light source 410 and photodetector array 420, on the other hand. These window and optical arrangements are typically designed to protect the optical components of the pointing device from dust and to focus the radiation emitted by light source 410 and the radiation reflected by the illuminated portion of surface S.

The optical pointing device further comprises clock means 430 for supplying a clock signal CLK to processing means 400. This clock signal CLK is used by processing means 400 to derive the necessary timing signals for the digital processing of data and for controlling the operations of photodetector array 420 and pulsing of light source 410. A gating means 435, such as a logic AND gate, is preferably interposed between clock means 430 and processing means 400 to selectively inhibit the supply of clock signal CLK to processing means 400. Activation of this gating means 435 is controlled by processing means 400 via a CLK_CTRL signal. This inhibition of clock signal CLK and its advantages will be explained in more detail in the following. It will be appreciated that clock means 430 is not essential and that clock signal CLK may perfectly be supplied by the host to which the optical pointing device is connected (via the line interface 450).

Three switches 441, 442 and 443 further supply additional control inputs to processing means 400. Activation of these switches 441, 442, 443 is typically controlled by means of corresponding buttons located on the device's housing.

Processing means 400 is further adapted to communicate in a bi-directional manner with a line interface 450 that communicates in turn with a host system (not illustrated) over a bus 455. Cursor control signals (and eventually other signals related to the optical pointing device) are supplied to the host system over bus 455. Processing means 400 may also receive information, such as configuration signals, over bus 455 from the host system.

As briefly mentioned hereinabove, processing means 400 is essentially designed to intermittently sample the pixel outputs of photodetector array 420 in accordance with a defined sequence. The edge information of two successive samples is compared and a relative motion measurement is extracted by processing means 400. The adequate cursor control signals are then derived from the relative motion measurement and transmitted to the host system via line interface 450.

According to a preferred embodiment of the present invention, the sensing device further includes level detection means 700 disposed outside of the array 420. Level detection means 700 are designed, on the one hand, to receive the pixel output signals and monitor the levels of these signals in order to derive specific timing signals for operating the sensing device as this will be apparent from the following. On the other hand, level detection means 700 are also advantageously adapted to detect the minimum level of the pixel output signals.

Figure 6A:
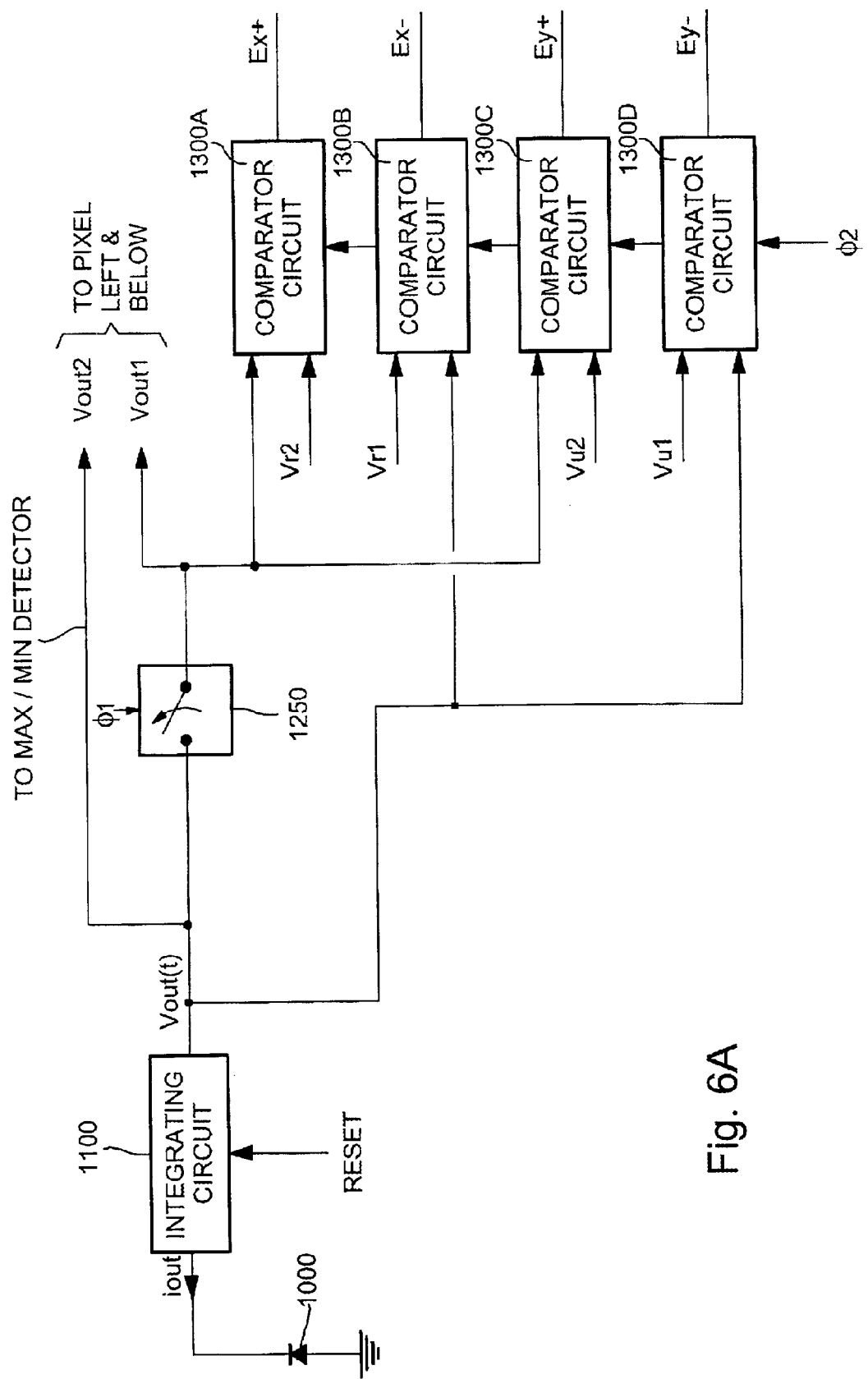
FIG. 6A schematically shows a first embodiment of the sensing device according to the present invention.

Referring now to FIG. 6A, one will describe a first embodiment of a sensing device according to the present invention. For the purposes of explanation, the same detection principle as that disclosed in U.S. Pat. No. 5,703,356 will be used in the following, i.e. a detection principle based on comparison of the intensity of the current pixel with the intensities of the pixel on the right and the pixel on top (as schematically illustrated in FIG. 10). It will however be appreciated that the detection principle is equally applicable to a single pair of pixels or to more than two pairs of pixels. In addition, it will be appreciated, from reading the following, that the edge conditions are not necessarily defined by the hereinabove expressions (2) to (4).

Although FIG. 6A only illustrates the active circuitry of a single pixel, it will be appreciated that other pixels of the photodetector array comprise identical circuitry. It will also be appreciated that not every pixel necessarily includes such circuitry. In particular, pixels located on the extreme right and top side of the photodetector array (i.e. pixels which do not have a neighbouring pixel on their right side and/or upper side) would not necessarily require identical comparator means. It will be appreciated however that each pixel will at least include the photosensitive element 1000 and the integrating circuit or preamplifier circuit 1100.

The sensing device of FIG. 6A is similar to the sensing device of FIG. 2 in that it comprises the photosensitive element 1000 (in this case a reverse biased photodiode), the integrating circuit 1100 for outputting the integrated signal Vout(t) representative of the photodiode current iout, and the four comparator circuits 1300A to 1300D. As before, the integrating circuit 1100 may be reset by activation of a RESET signal and released during a determined integration period by deactivation of the RESET signal.

In contrast to the prior solution, the sensing device of FIG. 6A does not comprise any scaling amplifier for providing a scaled image of the integrated signal Vout(t). According to the present invention, the output of integrating circuit 1100 is connected directly to the second input of comparator circuits 1300B and 1300D. In addition, interrupting means 1250 are interposed between the integrating circuit output and the first input of comparator circuits 1300A and 1300C. These interrupting means 1250 are designed to disconnect (upon activation of a first timing signal φ1) the first input of comparator circuits 1300A and 1300C from the output of integrating circuit 1100 at the end of a first time period which is shorter than the integration period. The corresponding interrupting means of the pixel on the right and the pixel on top are operated in a similar manner. The resulting integrated signals at that time may conveniently be stored on the input capacitance of the first input of the comparator circuits. An additional capacitive element or any other suitable storing means, may be connected on the first inputs of the comparator circuits.

Figure 6B:
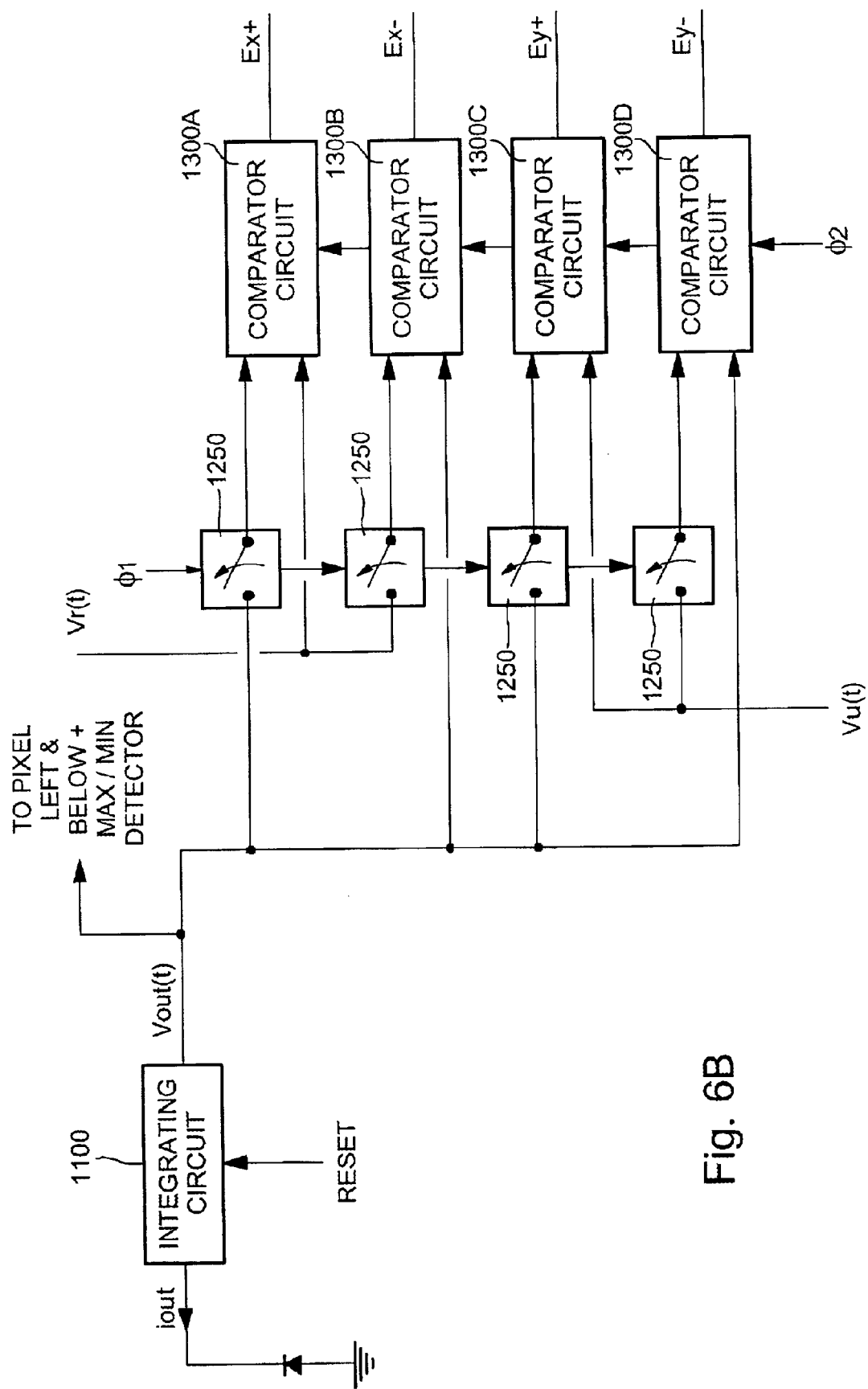
FIG. 6B schematically shows a second embodiment of the sensing device according to the present invention.

As illustrated in FIG. 6B, interrupting means 1250 may alternatively be disposed on the first input of each comparator circuit. This would have the advantage of reducing the number of inter-pixel connexions to two connexions (one for the pixel on the left and one for the pixel below) instead of four connexions in the example of FIG. 6A. For simplicity, each interrupting means may be implemented as a simple switching transistor, the gate of which is controlled by timing signal φ1.

Similarly to the prior art solution, the scaled image and non-scaled image of the integrated signal supplied by the pixels located on the right and on top are supplied to comparator circuits 1300A to 1300D. In the example of FIG. 6A, the non-scaled images of the integrated signals of the pixel on the right and the pixel on top are designated by references Vr1 and Vu1, the corresponding scaled images of these signals being designated by references Vr2 and Vu2. The non-scaled image, designated Vout1, and the scaled image, designated Vout2, of the integrated signal Vout(t) of the pixel are similarly supplied to the pixel on the left and the pixel below. According to an advantageous embodiment of the present invention which will be described hereinafter in more details, signal Vout(t) is also supplied to additional level detection means outside of the array.

According to the example of FIG. 6B, it will be appreciated that the pixel receives directly the output signals Vr(t) and Vu(t) of the pixel on the right and the pixel on top, and supplies its output signal Vout(t) to the pixel on the left and the pixel below.

The logic NAND gates 1400A to 1400C of FIG. 2 have not been illustrated in the embodiment of FIGS. 6A and 6B. As a matter of fact, these logic NAND gates are not absolutely necessary and the four comparator outputs may directly supply their respective edge signals to the processing means. As already mentioned, each comparator circuit 1300A to 1300D individually outputs an edge information. For instance, comparator circuit 1300A outputs a first edge information that may be designated as a first positive edge information Ex+, the definition of which is as follows:

$$Ex+ = \text{Intensity[pixel]} > K \text{ Intensity[pixel on right]} \quad (5)$$

Similarly, comparator circuit 1300B outputs a second edge information, which is the complement of first positive edge information Ex+, and that may be designated as a first negative edge information Ex−, the definition of which is as follows:

$$Ex- = K \text{ Intensity[pixel]} > \text{Intensity[pixel on right]} \quad (6)$$

Using the same terminology, comparator circuits 1300C and 1300D respectively output a second positive edge information Ey+ and a second negative edge information Ey−, the definitions of which are as follows:

$$Ey+ \text{Intensity[pixel]} > K \text{ Intensity[pixel on top]} \quad (7)$$

$$Ey- = \text{Intensity[pixel]} > \text{Intensity[pixel on top]} \quad (8)$$

Logic gates may nevertheless be provided to logically combine the comparator circuit outputs in the adequate manner. Using the above terminology, it will be appreciated that these logic gates would be logic OR gates in this case.

In addition, it will be appreciated that four distinct comparator circuits are not required. It may be perfectly envisaged to determine the relative motion measurement based on two conditions out of the four conditions above. For instance, post-processing of the edge data may be based only on the above first positive edge information Ex+ and second positive edge information Ey+.

Figure 7:
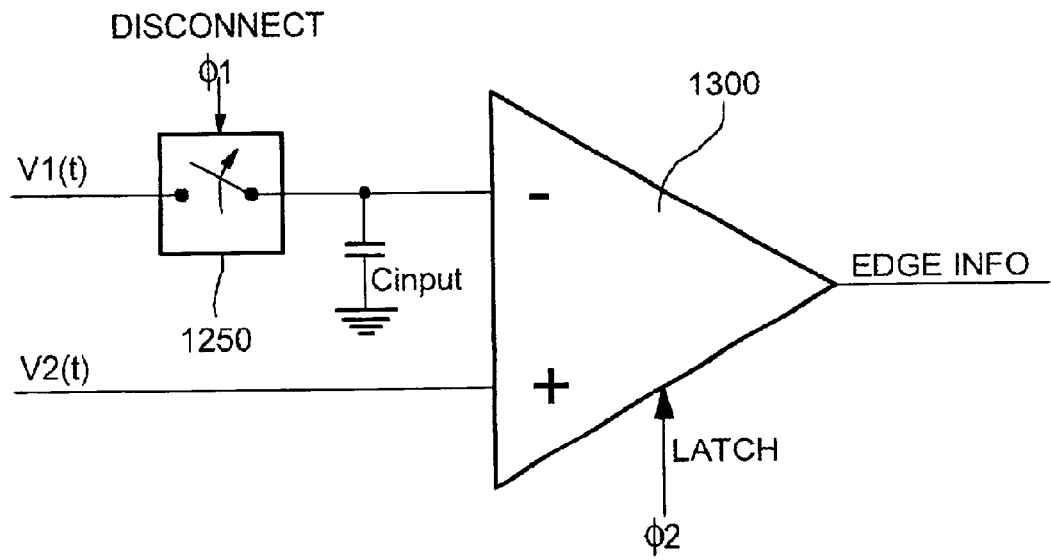
FIG. 7 is a schematic representation of a comparator circuit implementing the time-based principle of the present invention.
Figure 8:
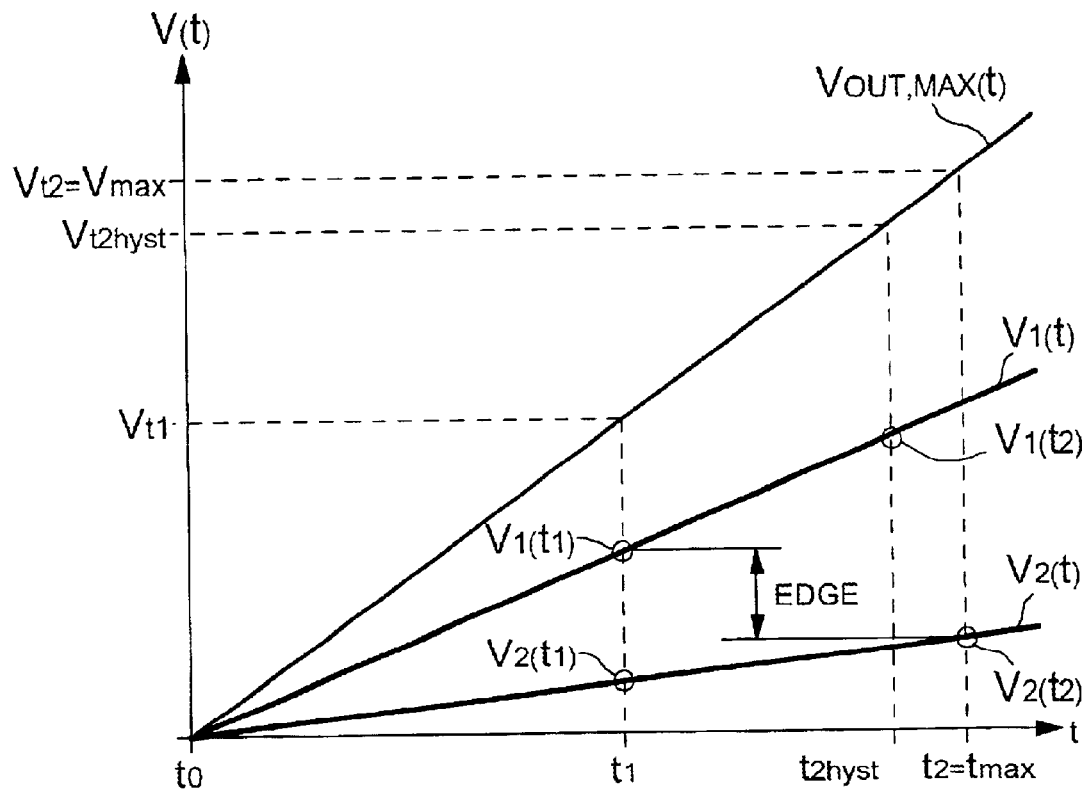
FIG. 8 is a diagram illustrating the evolution as a function of time of the integrated signals outputted by the integrating circuits of two pixels as well as the evolution as a function of time of the integrated signal outputted by the brightest pixel of the array.

Referring now to FIGS. 7 and 8, one will now describe the edge detection principle according to the present invention. According to the present invention, a time-based scaling scheme is implemented to detect an edge condition between two pixels. Assuming that the current signals outputted by the photosensitive elements are constant during the integration period, the integrated signals outputted by the integrating circuits will vary in a linear manner over time. As illustrated in FIG. 8, a first integrated signal V1(t) of a first pixel and a second integrated signal V2(t) of a second pixel may therefore be illustrated as linear curves. Assuming that the illumination level of these two pixels is different, the slope of these integrated signals will be different. In this case, signal V1(t) varies more strongly over time than signal V2(t), signifying that the first pixel has a greater illumination level than the second pixel.

As schematically illustrated in FIG. 7, the first and second integrated signals V1(t) and V2(t) are respectively supplied on first and second inputs of a comparator circuit 1300 illustrated as an operational amplifier. An interrupting means 1250 is disposed on the first comparator input so as to disconnect this first input from the corresponding signal upon activation of timing signal φ1 (at a time t1 following the start of an integration period). After disconnection, the resulting integrated signal is stored on an input capacitance Cinput of the comparator circuit. The comparator circuit is latched upon activation of a second timing signal φ2 (at a time t2 corresponding to the end of the integration period) to provide the output signal representative of the difference between the signals applied on its two inputs.

Referring to FIG. 8, interruption of the integration of the first integrated signal V1(t) at the end of a first time period t1−t0 (this interruption being controlled via the first timing signal φ1) results in a voltage signal having a first value V1(t1). Continuation of the integration of the second integrated signal V2(t) until the end of a second time period t2−t0, or integration period, (this being controlled by the second timing signal φ2) results in a voltage signal having a second value V2(t2). Similarly, interruption of the integration of the second integrated signal V2(t) at time t1 and continuation of the integration of the first integrated signal V1(t) until time t2 result in voltage signals having first and second values V2(t1) and V1(t2). It will be appreciated that the ratio between these second and first values corresponds to the scaling factor K and is determined by the ratio between the second and first integration periods. The relationship between the scaling factor, the first and second values and the first and second time periods t1−t0 and t2−t0 may be summarized as follows:

$$K = V1(t2)/V1(t1) = V2(t2)/V2(t1) = (t2-t0)/(t1-t0) \quad (9)$$

Assuming that integrated signal V1(t) corresponds to the output signal Vout(t) of FIG. 6A or 6B and integrated signal V2(t) corresponds to the output signal of the pixel on the right, it will be appreciated that comparator circuit 1300A would in this case detect a first positive edge Ex+.

According to the present invention, the scaling factor K is simply determined by the ratio between the first and second time periods. Adjustment of this scaling factor K can accordingly be easily effected by changing one or both of the first and second time periods.

The ratio between the second and first time periods can be controlled via the processing means. A first solution simply consists in activating the interrupting means 1250 of each pixel at time t1 (thereby disconnecting the first input of every comparator circuits of the photodetector array) followed by the activation of the comparator circuits at time t2, instants t1 and t2 being directly derived from the clock signal CLK.

Figure 9:
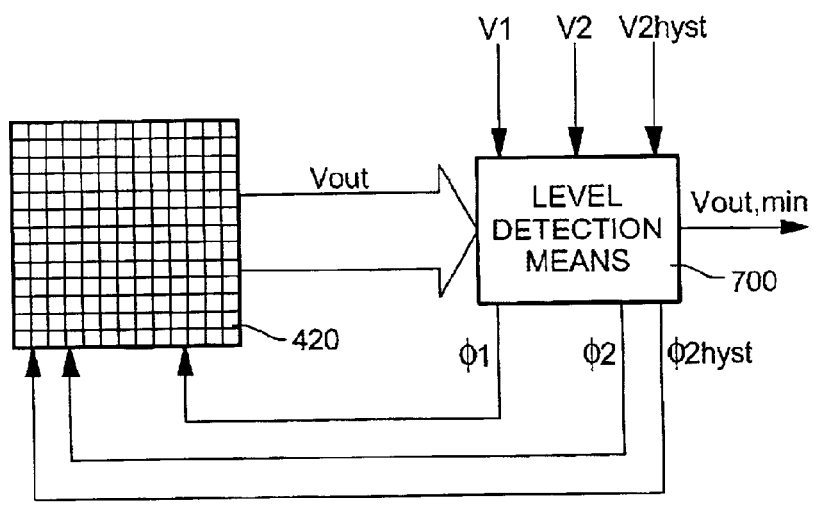
FIG. 9 is a schematic representation of level detection means for outputting timing signals for controlling the operations of the pixel circuitry.

Preferably, instants t1 and t2 (i.e. timing signals φ1 and φ2) are not derived from the clock signal CLK, but are determined using the level detection means 700 of FIG. 4 that monitor the level of the integrated signals of all pixels. Such level detection means 700 are schematically illustrated in FIG. 9. The purpose of level detection means 700 is to monitor the level of the integrated signals of all pixels and detect when the first one of these integrated signals (i.e. the signal of the brightest pixel in the photodetector array) reaches first and second levels. As illustrated in FIG. 8, first and second levels Vt1 and Vt2 (=Vmax) are defined, and the integrated signals of the brightest pixel in the array, designated Vout,max(t), is detected by level detection means 700. The first time period t1−t0 is thus defined by the time taken by integrated signal Vout,max(t) to reach the first level Vt1. Similarly, the second time period t2−t0 is defined by the time taken by integrated signal Vout,max(t) to reach the second level Vt2.

One advantage of level detection means, resides in the fact that contrast will be maximized since integration is continued until the integrated signal of the brightest pixel in the array reaches the second level (or maximum integration level) Vt2. Another advantage of these level detection means resides in the fact that the digital and analog operations of the sensing device may be separated, that is the clock signal CLK may be inhibited during the integration period, since timing is derived from the evolution of the maximum integrated signal Vout.max(t). Indeed, referring again to FIG. 4, the gating means 435 may be deactivated during the integration period (CLK_CTRL at a low logic state), thereby inhibiting the supply of clock signal CLK to the processing means, and be reactivated upon the end of the integration period. This inhibition of the clock signal during analog measurement (i.e. during the integration period) eliminates digital impact (coupling, noise) to analog operations, thereby minimizing analog circuit errors and maximizing system sensitivity.

Contrast ratio sensing may also easily be implemented using the level detection means. In this case, level detection means 700 may be adapted to test all pixels upon the end of integration and to provide a measurement of the minimum integration level, designated Vout,min. This measurement Vout,min may be converted to a digital word and transmitted to the host system to provide a measurement of the actual signal contrast seen by the sensor array.

Referring again to FIG. 8, the time-based principle used according to the present invention may further be adapted to implement a hysteresis function. This can easily be achieved by defining a third time period t2hyst−t0 (or second integration period) which is shorter than the integration period t2−t0. This can either be achieved by defining a third instant t2hyst or, referring to the level detection means of FIG. 9, by defining a third level Vt2hyst and detecting when the first one of the integrated signals reaches this level, level detection means 700 supplying a third timing signal designated φ2hyst.

Figure 11:
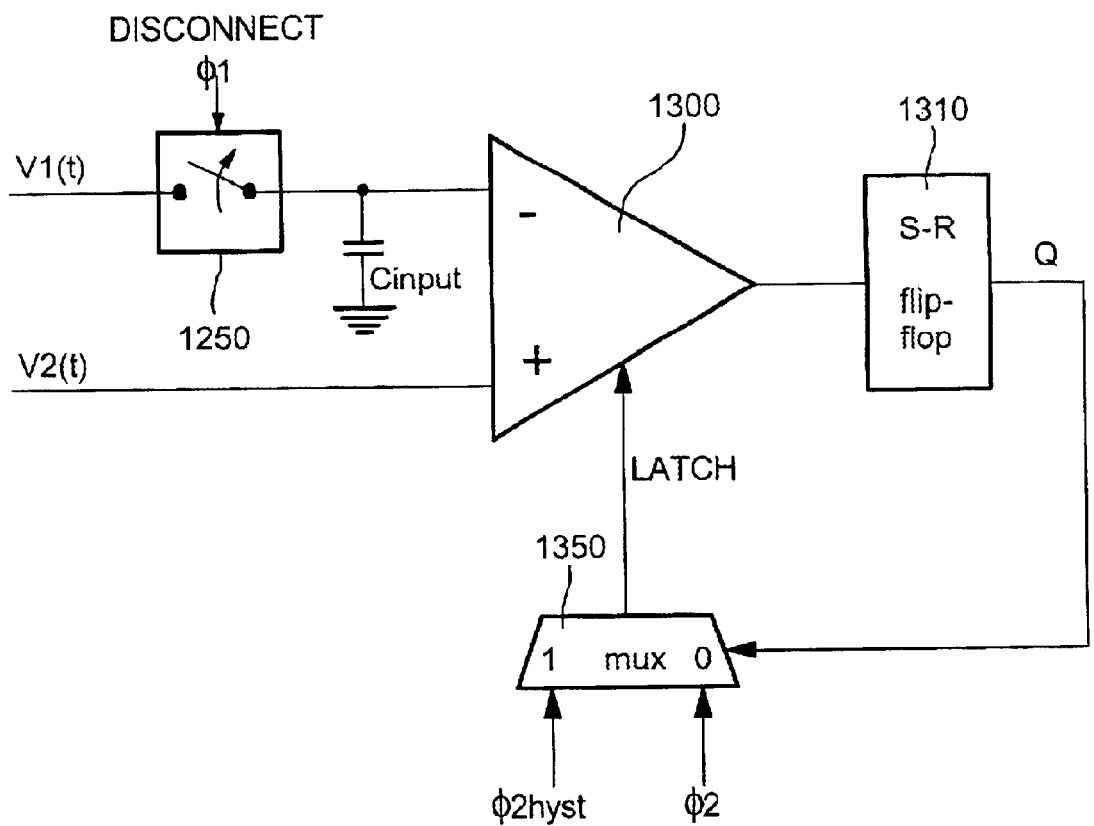
FIG. 11 is a schematic representation of means for implementing a hysteresis function for each comparator circuit.

Referring to FIG. 11, the comparator circuits may be adapted so as to selectively apply timing signals φ2 or φ2hyst depending on the state of the previous comparator output signal. To this end, a latch element 1310 (such as a conventional S-R flip-flop) can be provided on the comparator circuit output in order to supply a signal representative of the previous state of the comparator output signal (i.e. a signal indicating whether or not an edge was previously detected). As schematically illustrated in FIG. 11, timing signal φ2hyst is selected if an edge was detected on the previous sample. Timing signal φ2 is otherwise selected if an edge was not detected on the previous sample. Selection of the adequate timing signal may easily be achieved using a conventional two-input multiplexing circuit 1350 which is controlled by the output signal Q of the latch element 1310.

It will be appreciated that the second integration period t2hyst−t0 may be selected to be equal to the first time period t1−t0. In this case, timing signal φ2hyst would in effect correspond to timing signal φ1. This specific implementation is used in the embodiment of FIG. 12.

Having described the invention with regard to certain specific embodiments, it is to be understood that these embodiments are not meant as limitations of the invention. Indeed, various modifications and/or adaptations may become apparent to those skilled in the art without departing from the scope of the annexed claims. For instance, the proposed embodiments are not necessarily limited to sensing devices comprising a regular array of pixels aligned along two orthogonal axes. Other pixel arrangements may be envisaged, such as pixel arrangements including pixels aligned along two (or more) non orthogonal axes.

Figure 12:
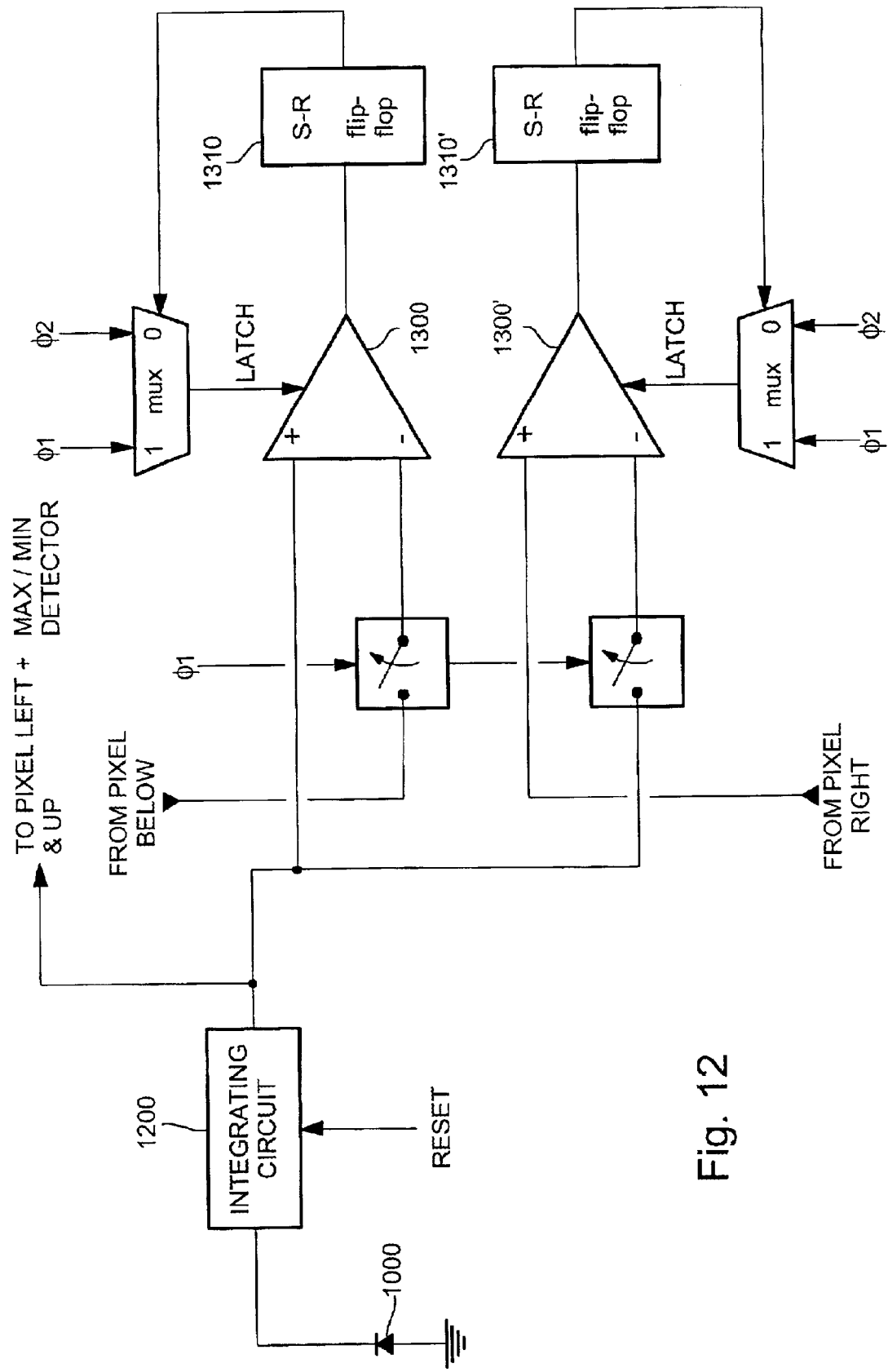
FIG. 12 is a third embodiment of a sensing device according to the present invention.

In addition, as already mentioned hereinabove, the sensing device according to the present invention does not necessarily include four distinct comparator circuits for providing suitable edge conditions information. In the case of a sensing device comprising a photodetector array including pixels aligned along first and second axes, at least one comparator per axis would be sufficient as illustrated in the embodiment of FIG. 12 which implements a hysteresis function wherein time t2hyst is selected to be equal to t1. The sensing device of FIG. 12 only comprises two comparator circuits 1300, 1300', one for providing a first edge condition between two pixels aligned along a first axis (in this case the current pixel and the pixel on its right) and the other one for providing a second edge condition between two pixels aligned along the second axis (in this case the current pixel and the pixel below). It will be appreciated that the embodiment of FIG. 12 also differs from the embodiments of FIGS. 6A and 6B in that it supplies its output signal to the pixel on its left and the pixel on top and receives the output signal of the pixels on its right and below.

Figure 13:
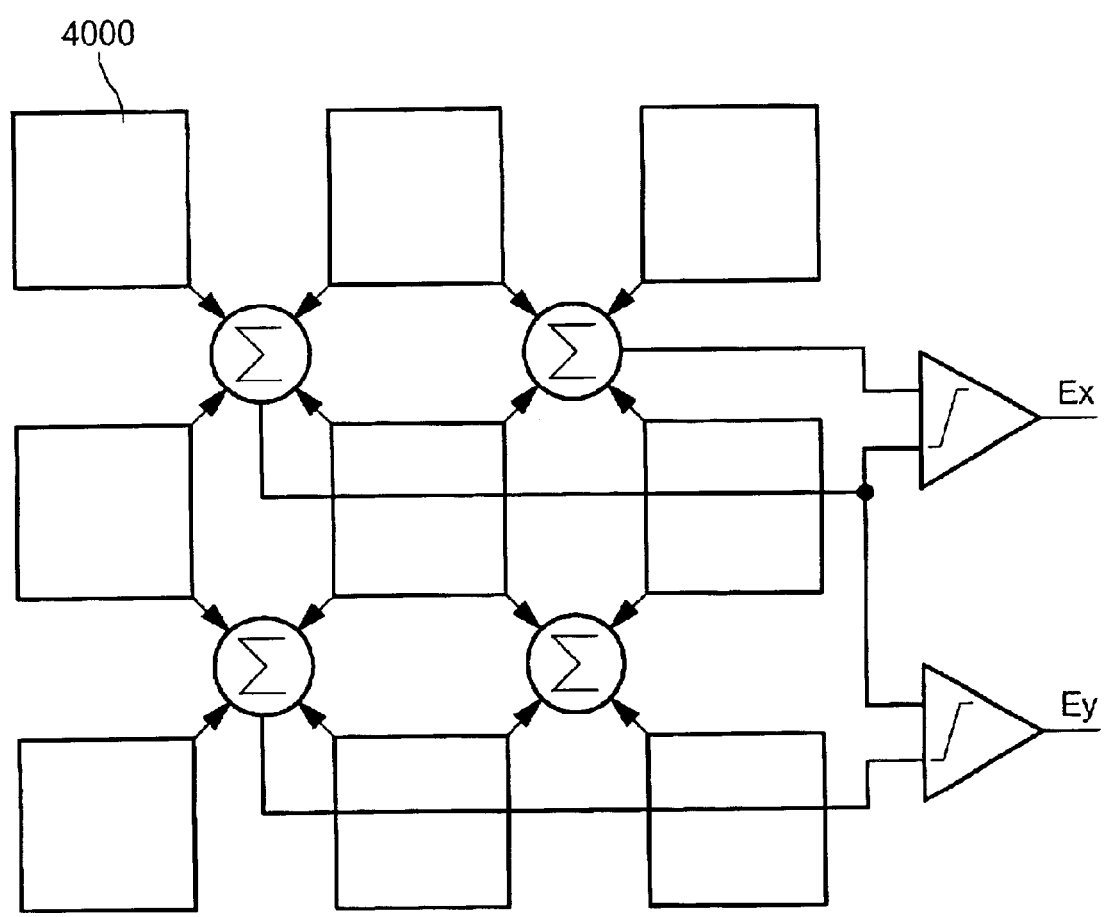
FIG. 13 is a schematic representation of an advantageous filtering principle used to sum the output signals of several pixels prior to comparison.

Finally, it will also be appreciated that each comparator input may be connected to more than one photosensitive element. For instance, the output signals of four adjacent pixels may be summed so as to create a "filtered" pixel as schematically illustrated in FIG. 13. An advantage of this filtering principle resides in the fact that it reduces high frequency spatial signals due to the randomness of the illuminated surface. This filtering principle is also the object of another pending application filed concurrently with this one.

What is claimed is:

1. In an optical pointing device, a method for comparing a light intensity between pixels of a photodetector array, each of said pixels comprising a photosensitive element generating a sensed output signal in response to radiation, this method comprising the steps of:

integrating said sensed output signals over time to provide an integrated signal for each of said photosensitive elements;

integrating a first sensed output signal of a first pixel until the end of a first time period and storing the resulting first integrated signal;

continuing the integration of a second sensed output signal of a second pixel until the end of a second time period to provide a second integrated signal; and comparing said first and second integrated signals to provide an output signal representative of an edge condition between said first and second pixels, wherein integration of said first sensed output signal is stored when a first one of said integrated signals generated by the photosensitive elements crosses a first level, said first time period being defined by the time taken by the first one of said integrated signals to reach said first level, and wherein integration of said second sensed output signal is continued until the first one of said integrated signals generated by the photosensitive elements reaches a second level, said second time period being defined by the time taken by the first one of said integrated signals to reach said second level.

2. The method of claim 1, wherein integration of said second sensed output signal is continued until the end of said second time period or until the end of a third time period shorter than said second time period depending on a state of said output signal, and wherein said third time period is defined by the time taken by the first one of said integrated signals to reach a third level lower than said second level.

3. The method of claim 1, wherein supply of a clock signal to processing means of the optical pointing device is inhibited during said second time period.

4. In an optical pointing device, a method for comparing light intensity between pixels of a photodetector array, each of said pixels comprising a photosensitive element generating a sensed output signal in response to radiation, this method comprising the steps of:

integrating said sensed output signals over time to provide an integrated signal for each of said photosensitive elements;

integrating a first sensed output signal of a first pixel until, the end of a first time period and storing the resulting first integrated signal;

continuing the integration of a second sensed output signal of a second pixel until the end of a second time period to provide a second integrated signal; and comparing said first and second integrated signals to provide an output signal representative of an edge condition between said first and second pixels, wherein integration of said second sensed output signal is continued until the end of said second time period or until the end of a third time period shorter than said second time period depending on a previous state of said output signal, wherein said output signal is at a first state, respectively second state, if said first integrated signal is greater, respectively lower, than said second integrated signal, and wherein:

if said output signal is at said first state, integration of said second sensed output signal is continued until the end of said third time period; and if said output signal is at a said second state, integration of said second sensed output signal is continued until the end of said second time period.

5. The method of claim 4, wherein said third time period is selected to be equal to said first time period.

6. A sensing device for an optical pointing device comprising a plurality of pixels including a first and a second pixel aligned along a first axis, each one of said pixels comprising:

a photosensitive element for generating a sensed output signal in response to radiation; and an integrating circuit connected to said photosensitive element for integrating said sensed output signal over time and for outputting a resulting integrated signal, said sensing device further comprising first comparator means for comparing light intensity between said first and second pixels and for determining if a first edge condition exists between said first and second pixels, wherein said first comparator means comprise a first comparator circuit having one comparator input connected to the integrating circuit of said first pixel and another comparator input connected to the integrating circuit of said second pixel, said sensing device further comprising:

means for resetting said integrating circuits during a resetting period and for releasing these integrating circuits during an integration period;

means for disconnecting a first comparator input of said first comparator circuit from the corresponding integrating circuit at the end of a first time period;

means for storing the resulting integrated signal on the disconnected first comparator input of said first comparator circuit; and means for latching said first comparator at the end of said integration period.

7. The sensing device of claim 6, further comprising a third pixel aligned with said first pixel along a second axis, said third pixel also comprising:

a photosensitive element for generating a sensed output signal in response to radiation; and an integrating circuit connected to said photosensitive element for integrating said sensed output signal over time and for outputting a resulting integrated signal, said sensing device further comprising second comparator means for comparing light intensity between said first and third pixels and for determining if a second edge condition exists between said first end third pixels, wherein said second comparator means comprise a second comparator circuit having one comparator input connected to the integrating circuit of said first pixel and another comparator input connected to the integrating circuit of said third pixel, said sensing device further comprising:

means for disconnecting a first comparator input of said second comparator circuit from the corresponding integrating circuit at the end of said first time period;

means for storing the resulting integrated signal on the disconnected first comparator input of said second comparator circuit;

means for latching said second comparator circuit at the end of said integration period.

8. The sensing device of claim 6, wherein the first comparator input of said first comparator circuit is connected to said first pixel and wherein said first comparator means further comprises a second comparator circuit having a first comparator input connected to the integrating circuit of said second pixel and a second comparator input connected to the integrating circuit of said first pixel, said sensing device further comprising:
means for disconnecting the first comparator input of said second comparator circuit from the integrating circuit of said second pixel at the end of said first time period;
means for storing the resulting integrated signal on the disconnected first comparator input of said second comparator circuit;
means for latching said second comparator circuit at the end of said integration period.

9. The sensing device of claim 7, wherein the first comparator input of said second comparator circuit is connected to said third pixel and wherein said second comparator means further comprises a third comparator circuit having a first comparator input connected to the integrating circuit of said first pixel and a second comparator input connected to the integrating circuit of said third pixel, said sensing device further comprising:
means for disconnecting the first comparator input of said third comparator circuit from the integrating circuit of said first pixel at the end of said first time period;
means for storing the resulting integrated signal on the disconnected first comparator input of said third comparator circuit;
means for latching said third comparator circuit at the end of said integration period.

10. The sensing device of claim 6, wherein said first and second pixels are adjacent along said first axis.

11. The sensing device of claim 7, wherein said first and third pixels are adjacent along said second axis.

12. The sensing device of claim 6, wherein a ratio between said first time period and said integration period is predetermined.

13. The sensing device of claim 6, further comprising level detection means for detecting when a first one of said integrated signals generated by the photosensitive elements crosses a first level, said first time period being defined by the time taken by the first one of said integrated signals to reach said first level, said level detection means further detecting when the first one of said integrated signals reaches a second level, said integration period being defined by the time taken by the first one of said integrated signals to reach said second level.

14. The sensing device of claim 13, further comprising processing means connected to said plurality of pixels for processing at least said first edge condition between said first and second pixels, and wherein supply of a clock signal to said processing means is inhibited during said integration period.

15. The sensing device of claim 13, wherein said level detection means further detect when the first one of said integrated signals reaches a third level lower than said second level.

16. The sensing device of claim 6, wherein said comparator circuit is latched at the end of a first integration period which has a first duration or at the end of a second integration period which has a second duration shorter than said first duration depending on a previous state of an output of the comparator circuit, wherein the output of said comparator circuit is at a first state, respectively second state if the integrated signal on the first comparator input is greater, respectively lower, than the integrated signal on the second comparator input, and wherein:
if said comparator output is at said first state, the integration period is selected to correspond to said second integration period; and
if said comparator output is at said second state, the integration period is selected to correspond to said first integration period.

17. The sensing device of claim 16, wherein said second integration period is selected to be equal to said first time period.

18. The sensing device of claim 6, further comprising means for testing all pixels at the end of said integration period and for providing a measurement of the integrated signal which has a minimum level.

19. The sensing device of claim 6, wherein said photosensitive element includes a photodiode or phototransistor.

20. The sensing device of claim 6, wherein said means for storing the integrated signal on the comparator input of said comparator circuit is an input capacitance of said comparator circuit.

21. The sensing device of claim 6, wherein said plurality of pixels is disposed so as to form a photodetector array, said sensing device further comprising processing means connected to said plurality of pixels for processing at least said first edge condition between said first and second pixels, said processing means bring disposed outside of said photodetector array.

22. The sensing device of claim 6, further comprising means for summing the output signals of a plurality of adjacent pixels prior to comparison by said comparator circuit.

23. An optical pointing device, comprising:
a light source for illuminating a portion of a surface with radiation;
a sensing device comprising a photodetector array including a plurality of pixels responsive to said radiation reflected from the illuminated portion of the surface, said sensing device outputting edge information representative of light intensity differences between pairs of adjacent pixels; and
processing means for processing said edge information to provide motion information about relative displacement between said sensing device and said illuminated portion of the surface,
wherein said sensing device is a device according to claim 6.

* * * * *